UNITED STATES PATENT OFFICE.

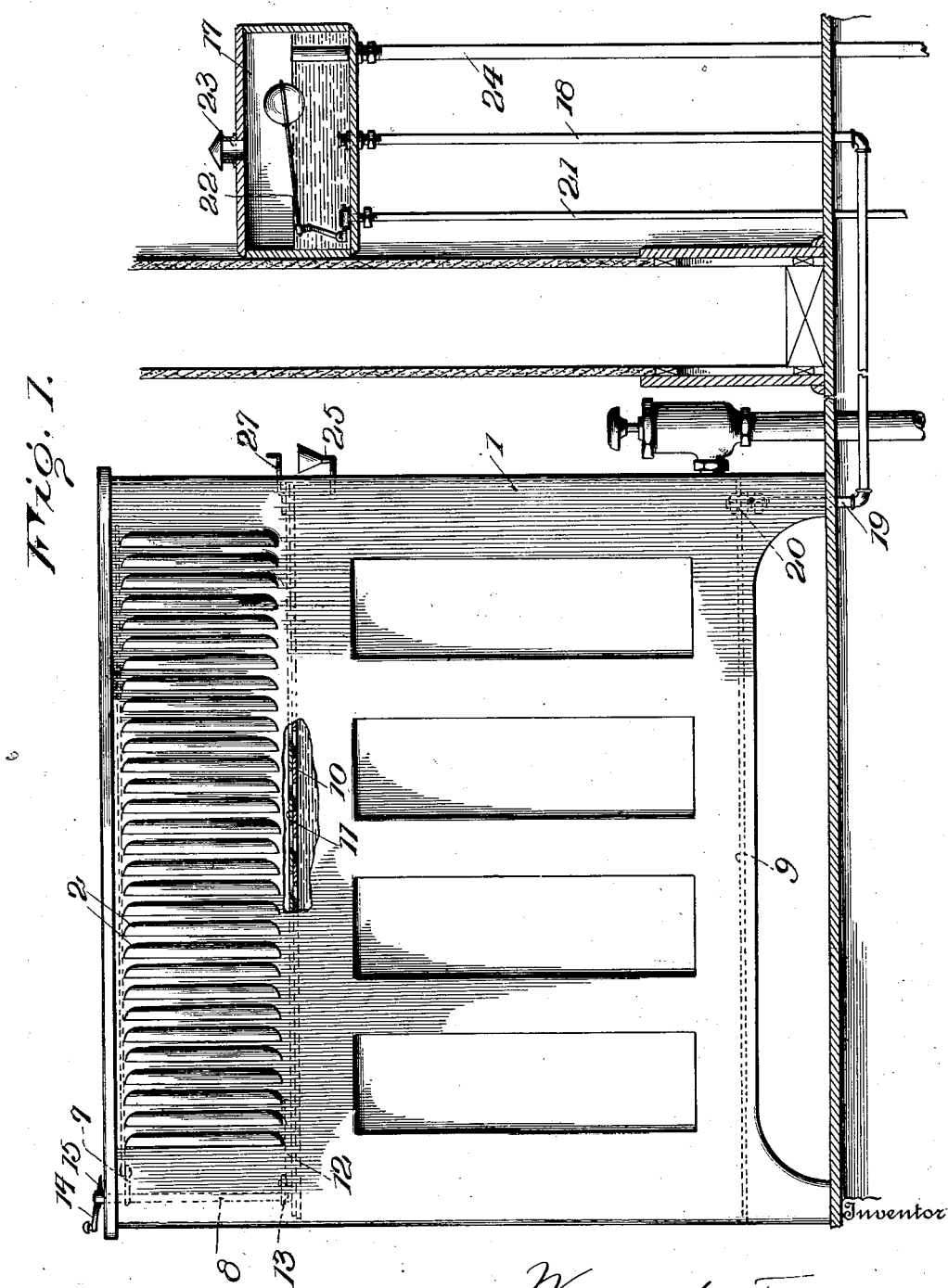

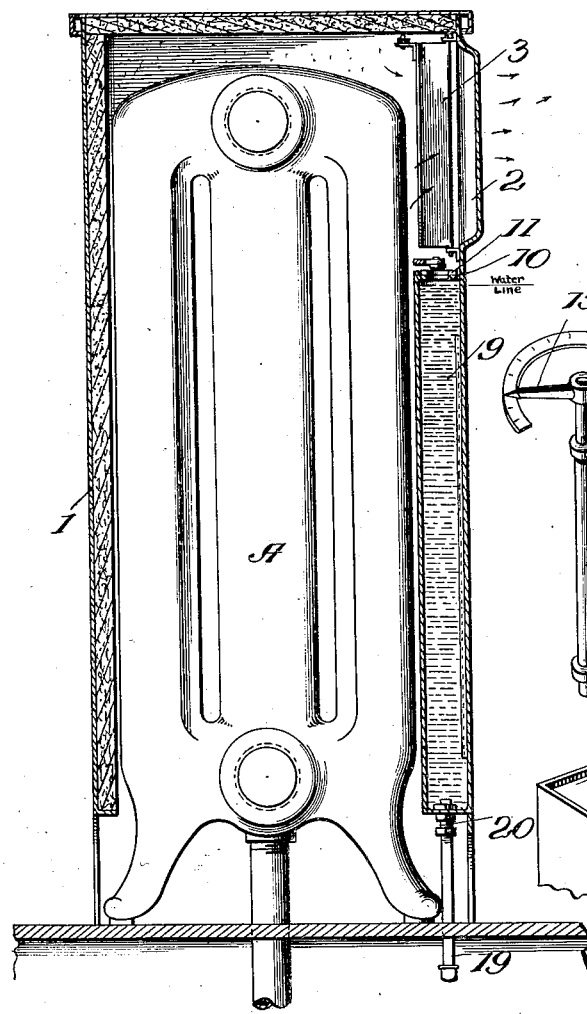
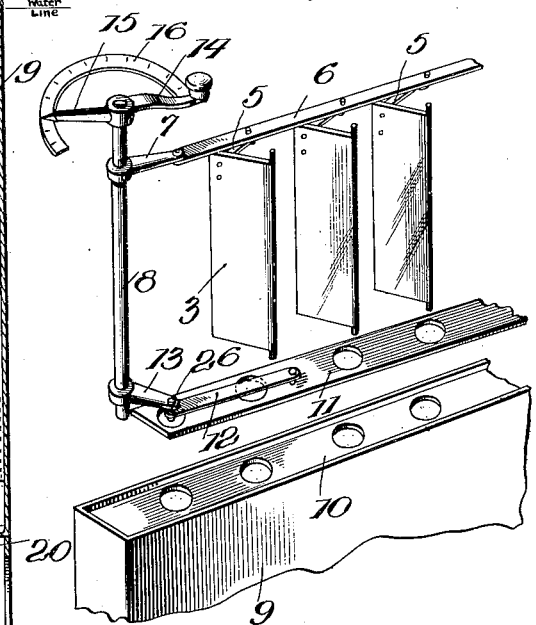
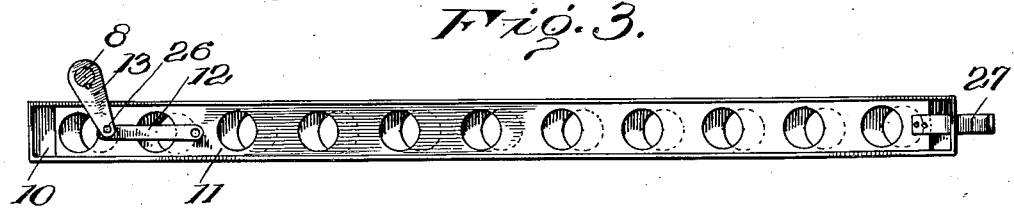

WESTON M. FULTON, OF KNOXVILLE, TENNESSEE, ASSIGNOR TO THE FULTON COMPANY, OF KNOXVILLE, TENNESSEE, A CORPORATION OF MAINE.

RADIATOR-CASING IN COMBINATION WITH HUMIDIFYING DEVICES.

1,349,059.     Specification of Letters Patent.     Patented Aug. 10, 1920.

Application filed July 24, 1916. Serial No. 110,958.

*To all whom it may concern:*

Be it known that I, WESTON M. FULTON, a citizen of the United States of America, and a resident of Knoxville, Tennessee, have invented a new and useful Improvement in Radiator-Casings in Combination with Humidifying Devices, which invention is fully set forth in the following specification.

This invention relates to casings for radiators having means for supplying moisture to the atmosphere to maintain its relative humidity at the desired amount.

In my Patent No. 1,305,532 granted June 3, 1919, I have described and claimed a casing for a radiator provided in the upper portion thereof with a vaporizing pan, and further provided with conjointly operative means for regulating the escape of heated air and vapor from the casing and pan respectively. In certain respects the object of this invention is to provide an improved construction embodying the general principles of the device disclosed in my aforesaid application.

A further object of this invention is to provide a casing for a radiator with a vaporizing pan which exposes a large surface area to the heat of the radiator to facilitate evaporation. Another object is to provide a radiator casing with a vaporizing pan of large capacity but occupying a minimum of space. Yet another object of this invention is to provide a radiator casing with a vertical vaporizing pan so disposed with relation to the air outlet that the heated air in its escape passes across the surface of the water whereby the proper amount of moisture is readily picked up and the evaporation facilitated. Another object of the invention is to provide a radiator casing with a vaporizing pan opening interiorly of the same and yet to prevent condensation or "sweating" on the interior walls of the casing when the radiator cools down after escape of heated air is prevented. A still further object of the invention is to provide a radiator casing with a vaporizing pan, in combination with means for controlling the escape of vapor therefrom conjointly with or independently of means provided for controlling the escape of heated air from the casing. Other objects will appear as the description proceeds.

The invention is capable of receiving a variety of mechanical expressions. While, for the purpose of illustration, one embodiment of the invention will be described with considerable particularity and is shown in detail on the accompanying drawings, it is to be expressly understood that the description and drawings are for the purposes of illustration only, and are not to be construed as a definition of the limits of the invention, reference being had to the appended claims for such purpose.

Referring to the accompanying drawings, wherein the same characters designate corresponding parts in the several figures—

Figure 1 is an elevation of a radiator casing embodying the present invention, the front wall thereof being partly broken away to show the means for controlling the escape of vapor; and further illustrating, in section, means for automatically supplying the vaporizing pan with water;

Fig. 2 is a vertical cross section through the radiator casing;

Fig. 3 is a plan of the damper for controlling the escape of vapor; and

Fig. 4 is a perspective of the dampers controlling the escape of heated air and vapor, parts being shown in separated relation for the sake of clearness.

1 designates any suitable casing for a radiator, illustrated at A, the casing being preferably constructed of sheet metal and having its top and such side walls as are not constituted by the vaporizing pan lagged with suitable material to prevent loss of heat by conduction. The upper front wall of the casing 1 is shown as provided with a series of louvers 2, or a grille of any desired construction, providing openings for the escape of heated air from the interior of the casing. In the rear of the louvers or grille in the form shown are means for controlling the escape of heated air from the casing. Such means may be of any suitable construction, being shown as composed of a plurality of pivotally mounted shutter-like damper members 3, so related as to close the air outlet openings when moved into approximate edgewise alinement. Each of the damper members has connected thereto an arm 5 pivotally connected to an operating link 6. The link 6 may be operated by any suitable means, the embodiment illustrated comprising a crank arm 7 pivotally connected to the link 6 and mounted for rotation with a stub shaft 8 having bearings in the top of the casing and in brackets in the interior of the casing.

The vertical walls of the casing include in their construction or are provided with a vaporizing pan, which may extend throughout a greater or less extent of such vertical walls. In the embodiment illustrated, the vaporizing pan 9 is shown as extending from one side to the other of the front wall of the radiator casing, and from the bottom of such casing to a plane immediately below the louvers or grille 2. It is to be expressly understood, however, that the pan may, and it is sometimes desirable that it should, extend over a greater or less portion of the vertical walls of the casing than that here illustrated. In the form shown, the vaporizing pan 9 is composed of the front wall of the casing and a wall extending parallel thereto a short distance therefrom, such walls together with the bottom and end walls constituting a tank-like vaporizing pan, affording a long, deep, narrow vessel exposing a large surface to the heat of the radiator, whereby evaporation is facilitated.

Means of any suitable construction are provided for controlling the escape of vapor from the vaporizing pan 9. In the embodiment illustrated, the top of the pan is provided with a cover piece 10 having a series of apertures of any desired configuration, the closed portions of the cover piece between the apertures being preferably slightly wider than the corresponding dimensions of the apertures. Mounted upon the top of this cover piece 10 is a damper member 11 mounted to slide upon the cover piece and provided with a series of apertures conforming in spacing and configuration with those provided in the cover piece 10. The damper piece 11 is shown as somewhat shorter than the cover piece 10, and may be reciprocated to a position wherein its apertures register with those in the cover piece 10, or wherein the closed spaces between its apertures entirely obstruct the apertures through the cover piece 10. Means of any suitable construction are provided for reciprocating the said damper piece 11, such means being shown as taking the form of a link 12 pivotally connected to the damper piece, and in turn pivoted to a crank arm 13 mounted upon the aforesaid stub shaft 8. While any suitable means, automatic or manual, may be employed for rotating the said stub shaft 8, the embodiment illustrated comprises manual means for performing this function, the same consisting of a handle piece 14, mounted above the top of the casing upon the projecting end of the stub shaft 8, and desirably provided with a pointer 15, which, by swinging over a dial 16 upon the top of the casing, may indicate the extent to which the aforesaid dampers are open.

Means are preferably provided for automatically supplying the vaporizing pan with water to compensate for the evaporation therefrom. In the embodiment illustrated, a supply tank 17 is mounted at any suitable location, and is connected with the vaporizing pan by a pipe 18 extending from the bottom of said tank downwardly to a position beneath the floor, and upwardly adjacent the radiator, as illustrated at 19, to any preferred form of nipple 20 extending through the bottom of the vaporizing pan. Tank 17 is further connected by a pipe 21 with any suitable source of water supply, and a float valve, generally indicated at 22, controls the admission of water to the tank in a well-known manner. That the pressure within the tank may remain equal to atmospheric pressure, the tank may be provided with a vent at 23. In order to prevent the vaporizing pan overflowing in case the float valve fails to operate, an overflow pipe 24, with its inlet end disposed slightly below the level of the top of the vaporizing pan, is provided in the tank 17.

In place of the automatic supply of water to the vaporizing pan, the pan may be filled by hand, in which case a supply pipe, illustrated in Fig. 1 at 25, may be provided, the same being shown as having a funnel-shaped portion with its top substantially at the desired level of the water in the pan. By pouring the water into the funnel-shaped portion of the supply pipe 25, the pan may be refilled without removing the casing or any of its parts, and as the water will rise in the funnel-shaped portion in clear sight of the person filling the pan, there is substantially no danger of the pan being filled to overflowing.

In damp weather, it frequently becomes desirable to prevent the escape of vapor while permitting the escape of heated air. Again, in warm, dry weather, it may be desirable to permit the escape of vapor without the escape of heated air. It is therefore desirable that one or the other of the aforesaid dampers should be disconnectible from the damper operating means. In the embodiment illustrated, pivot pin 26, between link 12 and crank arm 13, is made readily removable, whereby the damper piece 11 will no longer be operated by actuation of stub shaft 8. To provide means for reciprocating the damper piece 11 under such conditions, the same is shown as having an extension 27 extending through a slot in the wall of the radiator casing to a position where it may be readily grasped and actuated by the hand.

In operation, air enters adjacent the bottom of the radiator casing, is heated by the radiator, and, rising convectionally, escapes through the louvers 2 if the damper members 3 are open. Heat is readily absorbed by the relatively large area of the inner surface of the vaporizing pan, and the water in such pan is warmed quickly and evaporation facilitated as said pan presents a relatively broad thin body of water to the direct heat of the radiator. The damper 11 is also open to an extent corresponding to the extent of opening of the damper members 3, and the vapor formed is taken up by the hot air as it passes across the top of the vaporizing pan as it escapes from the casing. If it be desired that more heat be supplied, damper members 3 may be opened to a greater extent by manipulation of handle member 14, and, owing to the common control for both dampers, the extent of opening of the damper 11 will correspondingly increase. Similarly, a decrease in the extent of opening of the damper members 3 will be accompanied by a corresponding decrease in the extent of opening of the damper 11.

If it be desired to manipulate the dampers independently of each other, pivot pin 26 is withdrawn, whereupon the damper members 3 may be manipulated by handle member 14, and damper piece 11 may be manipulated by extension 27.

Under some circumstances, it may be desirable to place the inner wall of the vaporizing pan directly in contact with the radiator within the casing. Alternatively, bridge pieces may be inserted between the inner wall of the pan and the radiator for the ready conduction of heat to the former.

By the disposition of the vaporizing pan in the vertical wall or walls of the radiator casing, it will be observed that a maximum surface is exposed to the heat of the radiator, whereby the evaporation from the pan is greatly facilitated while at the same time the pan occupies but a minimum space. It will also be observed that the vaporizing pan serves the incidental function of an auxiliary storage tank for the heat. By disposing the tank within the casing in the path of the heated air in its escape, the vapor is readily picked up and evaporation facilitated, insuring that the heated air is supplied with the proper amount of moisture. On the other hand, the provision of a damper which automatically closes the vaporizing pan when the heat-regulating damper is closed, insures that there shall be substantially no escape of vapor into the interior of the radiator casing to produce condensation or sweating upon the interior walls thereof.

While the invention has been illustrated in connection with manual means for adjusting the dampers controlling the escape of heated air and vapor, it is to be understood that the invention contemplates the use of any other suitable means for controlling the adjustment of the dampers, whether automatic or manual.

What is claimed is:—

1. A radiator casing having an air outlet opening in a side wall thereof and a vaporizing pan immediately below said opening whereby the heated air in its escape from said casing passes across the surface of the water in said pan, said pan presenting a relatively large surface to the direct heat of said radiator whereby evaporation of the water is facilitated.

2. A radiator casing having an air-outlet opening in a side wall thereof, said side wall being provided with a vaporizing pan immediately below said opening whereby the heated air in its escape from the casing passes across the surface of the water in said pan, and a damper for controlling the escape of vapor from said pan.

3. A radiator casing provided with an air-outlet opening in a side wall thereof, a vaporizing pan in said side wall below said opening, a damper for said opening, a damper for controlling the escape of vapor from said pan, and a common controlling means for said dampers.

4. A radiator casing provided with a vertical vaporizing pan opening interiorly thereof, an air-outlet opening in the side of said casing immediately above the plane of the opening of said pan, and a damper to control the escape of vapor from said pan into the current of heated air passing through said opening.

5. A radiator casing provided with a vertical vaporizing pan opening interiorly thereof, and an air-outlet opening in a side of said casing above the plane of the opening of said pan, said pan being substantially coextensive with the portion of said side wall below said opening.

6. A radiator casing provided with a vaporizing pan opening interiorly of said casing, a damper-controlled air-outlet opening, and means in said casing to prevent the escape of vapor from said pan into said casing.

7. A radiator casing provided with a vaporizing pan opening interiorly thereof, an air-outlet opening, a damper to control the escape of heated air through said opening, a damper in said casing to prevent the escape of vapor from said pan into said casing, and common controlling means for said dampers.

8. A radiator casing having a vertical vaporizing pan opening into the path of the air flowing from said casing and presenting a relatively broad thin body of water to the direct heat of the radiator, and means for controlling the escape of vapor from said pan.

9. A radiator casing provided with means to control the escape of heated air therefrom, a vertical vaporizing pan in the side wall of said casing, and means for controlling the escape of vapor from said pan.

10. A radiator casing provided with a damper to control the escape of heated air therefrom, a vertical vaporizing pan in the side of said casing, a damper for controlling the escape of vapor from said pan, and a common controlling means for said dampers.

11. A radiator casing provided with an air-outlet opening, and a deep, narrow vaporizing pan exposed throughout its length and depth to the heat of the radiator and so positioned that the surface of the liquid therein is subjected to the heated air as it passes through said opening.

12. A radiator casing provided with an air-outlet opening, a deep, narrow vaporizing pan exposed throughout its length and depth to the heat of the radiator and exposing the surface of the liquid therein to the heated air as it passes through said opening, and means for controlling the escape of vapor from said pan.

13. A radiator casing provided with an air-controlling damper, a deep, narrow vaporizing pan exposed throughout its length and depth to the heat of the radiator and exposing the surface of the liquid therein to the heated air as it passes through said damper, a damper for controlling the escape of vapor from said pan, and a common controlling means for said dampers.

14. A radiator casing provided with a vertical vaporizing pan opening interiorly thereof, an air-outlet opening, a damper for said opening, a damper for controlling the escape of vapor from said pan, and means whereby said dampers may be operated independently.

15. A radiator casing provided with a vertical vaporizing pan opening interiorly thereof, an air-outlet opening, a damper for said opening, a damper for controlling the escape of vapor from said pan, a common controlling means for said dampers including a disconnectible connection, and manual means for operating one of said dampers independently of the other.

16. A radiator casing provided with an air-outlet opening, a vaporizing pan in said casing so positioned that the surface of the water therein is subjected to a current of heated air, a damper for said opening, a damper for controlling the escape of vapor from said pan, and common controlling means for said dampers.

In testimony whereof I have signed this specification.

WESTON M. FULTON.